Nov. 24, 1936.　　　A. WADDICK　　　2,061,955

SEED HOLDING AND DISTRIBUTING DEVICE

Filed June 5, 1936　　　3 Sheets-Sheet 1

Inventor

Arthur Waddick

By Clarence A. O'Brien
Hyman Berman
Attorneys

Nov. 24, 1936.  A. WADDICK  2,061,955
SEED HOLDING AND DISTRIBUTING DEVICE
Filed June 5, 1936    3 Sheets-Sheet 2

Inventor
Arthur Waddick

By Clarence A. O'Brien
Hyman Berman
Attorneys

Nov. 24, 1936.  A. WADDICK  2,061,955
SEED HOLDING AND DISTRIBUTING DEVICE
Filed June 5, 1936  3 Sheets-Sheet 3
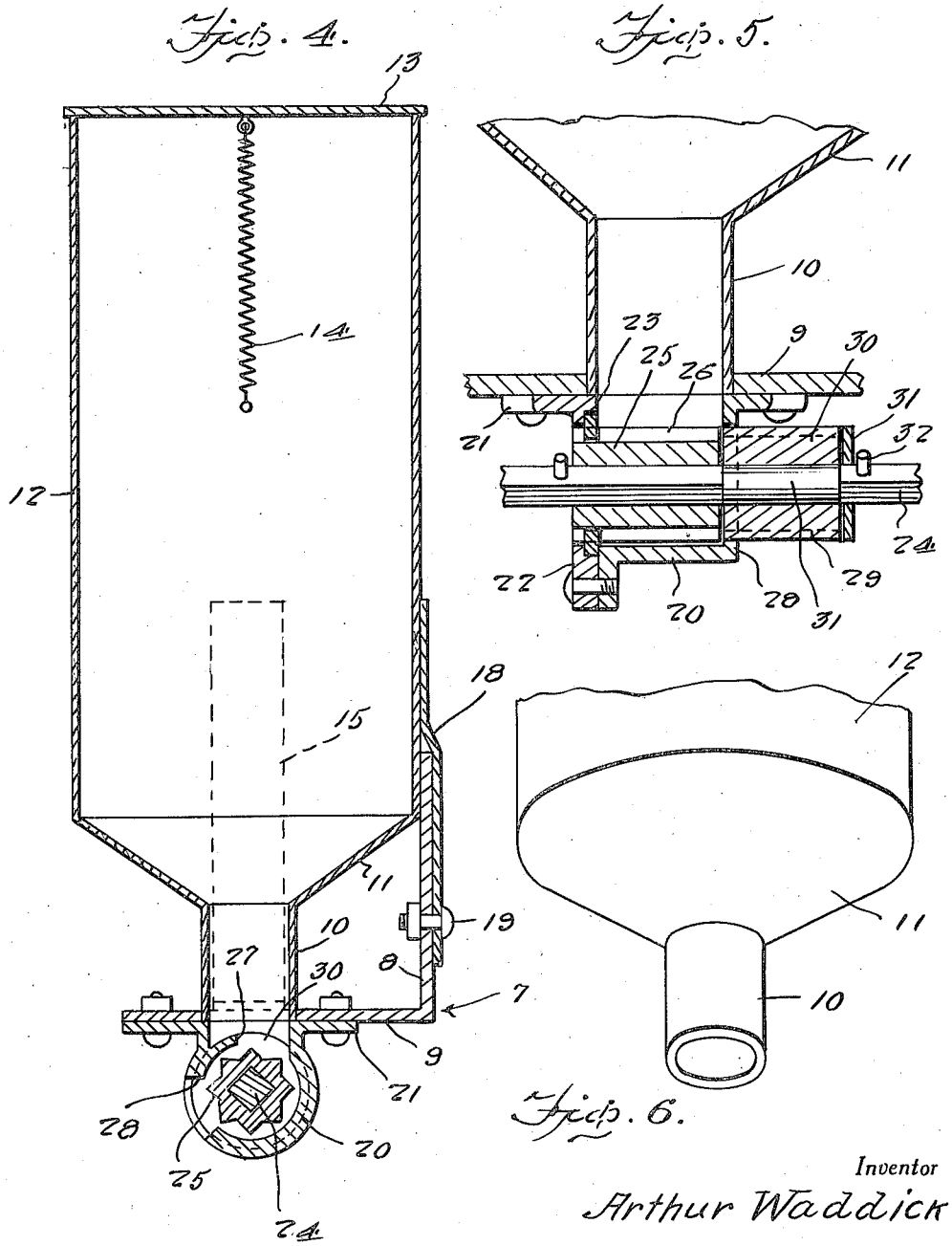
Inventor
Arthur Waddick
By Clarence A. O'Brien
Hyman Berman
Attorneys Patented Nov. 24, 1936

2,061,955

UNITED STATES PATENT OFFICE 2,061,955

SEED HOLDING AND DISTRIBUTING DEVICE

Arthur Waddick, Peosta, Iowa

Application June 5, 1936, Serial No. 83,786

2 Claims. (Cl. 221—136)

The present invention relates to valved or regulated seed holding and dispensing means, and has reference in particular to a protective storage container for the seed and manually regulated mechanical dispensing or discharging means cooperable therewith.

It is a matter of common knowledge to those familiar with machinery in this particular line of endeavor that all sorts of makeshift structures are utilized including open top boxes and troughs and other unreliable receptacles and containers calculated to get out of order easily and interfere with proper handling and seeding work. Under the circumstances and with the objectionable marketed constructions in mind, I have set out to correct some of these evils by perfecting what is believed to be a more satisfactory arrangement characterized in particular by a sturdy and reliable seed containing and dispensing hopper and supporting and valving means therefor.

My primary aim is to generally improve upon known prior art and patented structures along the same general lines by providing an arrangement including a simple angle-iron support equipped with valving and regulating means and an associated inverted gravity feed container or hopper for the seeds structurally associated with the angle-iron and valve means.

Other features and advantages will become more readily apparent from the following description and the accompanying illustrative drawings.

In the drawings, wherein like numerals are employed to designate corresponding details or parts throughout the views:

Figure 4 is a central vertical sectional view through the assemblage depicted in Figure 1;

Figure 5 is a fragmentary sectional view emphasizing the slidable rotary valving or dispensing means;

Figure 6 is a fragmentary perspective view of the discharge end of the cylindrical hopper or container for the seed.

Figure 1:
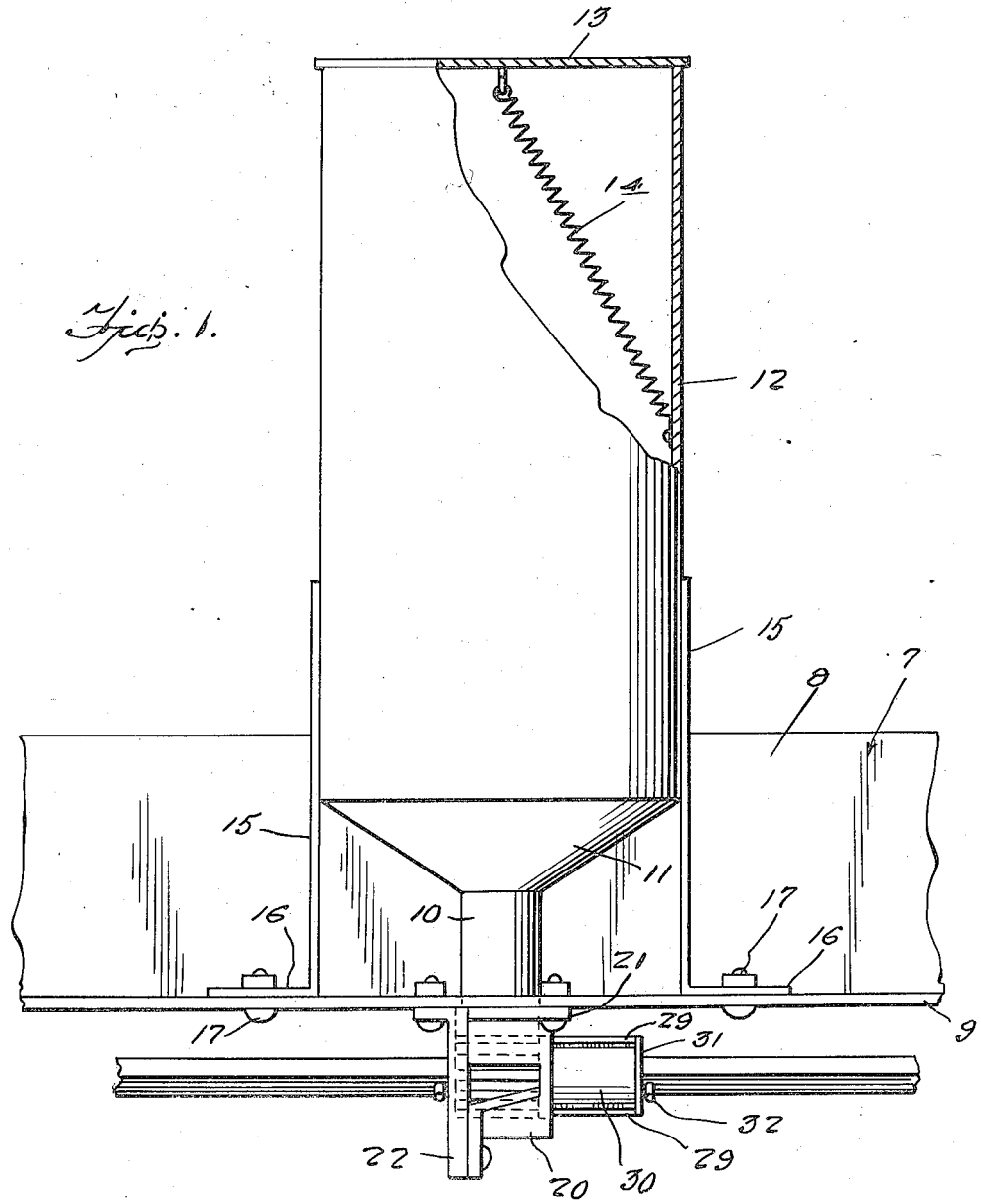
Figure 1 is an elevational view with portions shown in section illustrating the arrangement or structure perfected in accordance with the principles of my invention.
Figure 2:
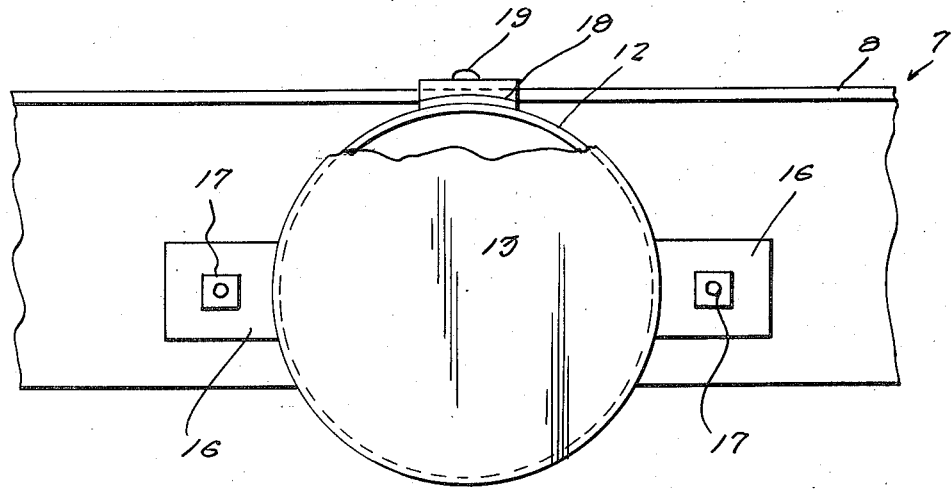
Figure 2 is a top plan view of the structure appearing in Figure 1.
Figure 3:
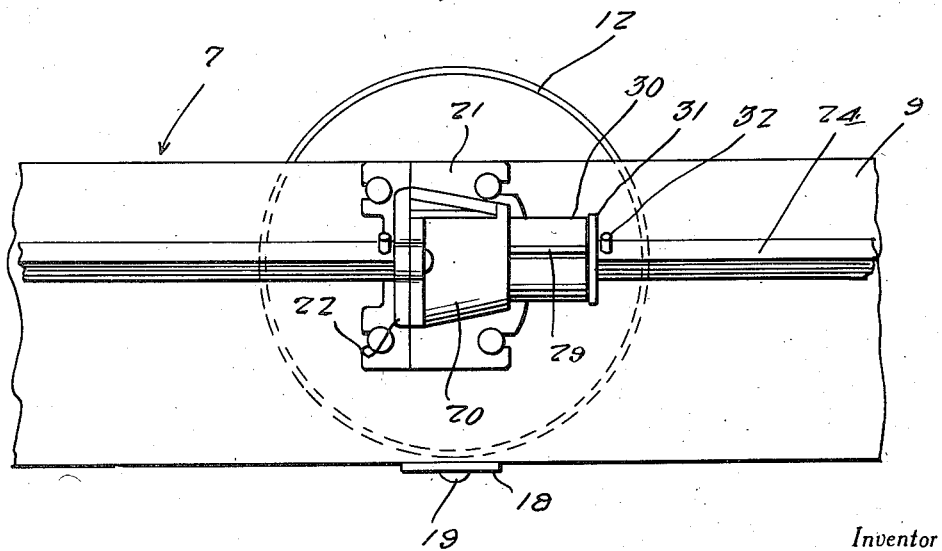
Figure 3 is a bottom plan view of Figure 1.

Referring first to Figure 1, and then to Figure 4, it will be noted that the aforementioned angle-iron is denoted by the numeral 7 and comprises an upstanding vertical stabilizing flange 8 and a base or ledge forming flange 9. The angle-iron may support any number of seed holding and distributing units. In the drawings, however, I have shown a single device which is sufficient to illustrate the principal and specific construction. The horizontal base flange 9 is provided with a circular opening to accommodate the centrally depending tubular neck 10 attached to the center of the concentrating conical bottom 11 of the metal cylinder or container 12 for the seed. This is open at its top, but provided with a removable protecting and closing lid 13 preferably held in place by a coil spring 14 attached at one end to the center of the lid and anchored at its opposite end in the container. When the container is charged with seed, the seed collects in the conical or hopper-like bottom 11 and is concentrated and ejected through the discharge neck 10. The container is held in place by a series of circumferentially spaced duplicate attaching straps or legs 15. The straps 15 have attaching feet 16 directed laterally and attached to the flange 9 by bolts or the like 17. There is a similar attaching strap 18 at the back fastened as at 19 to the upstanding flange 8. This provides the desired stabilized association between the apertured angle-iron, the retention legs or brackets, and the inverted hopper-equipped cylinder or container 12 for the seed.

Attention comes now to the regulating or dispensing valve unit which is mounted in registry with the opening in flange 9 as well as the discharge neck 10. This unit is also attached to the flange 9 giving it a plurality of functions. The valve unit comprises a casing 20 having an attaching flange 21, said casing being of general cylindrical form as shown in cross-section in Figure 4. At one end is an appropriate removable closing plate 22. The attaching plate 21 has an annulus 23 extending into the opening of flange 9, as shown in Figure 5 to serve as a supporting ledge or rest for the neck 10 which telescopes into and through the opening in said flange 9. There is a rotary slidable shaft denoted by the numeral 24 and this is of polygonal cross-sectional form and extends through and beyond the cylindrical casing 20. It is provided with a rotary regulating valve element 25 elongated in form and provided with a series of ribs 26 on its periphery defining pockets for reception and delivery of the seed. Incidentally, the seeds enter the casing 20 as indicated at the point 27 in Figure 4 and are discharged out through one side, as at 28. The turning of the shaft and valve as a unit provides the desired systematic distribution. It is to be noted, however, that the end wall 28 of the casing is formed with diametrically opposite notches to accommodate diametrically opposite ribs or keys 29 on the plug closing unit 30. This is mounted on a cylindrical portion 31 of the shaft and has the ribs extending through the notches in readiness to permit the plug to be slipped into closing position in said casing 20. The numeral 31 merely designates a retention washer and 32 a stud or pin for holding the washer in place. Normally when the device is operating, the valve unit 25 is located in the casing for cooperation for the openings 27 and 28. This is shown in Figures 4 and 5. By bodily shifting the shaft 24 in a longitudinal direction, the valve can be pushed out from the casing and the stop plug 30 can be substituted to close off the passage of seed down through the neck 10 and the valving casing 20. It is to be observed that the so-called closing member or plug 30 is in effect a bearing or bushing to support the cylindrical portion 31 of the shaft and to allow the shaft to rotate therein. The valve member 25 is, however, on the polygonal portion of the shaft thus providing the desired keying action.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. In a structure of the class described, in combination, an angle-iron including a horizontal flange and a vertical flange, said horizontal flange having a circular opening formed therein, a seed holding container, the bottom thereof having a conical hopper and a centralized depending tubular neck extending into the opening in said horizontal flange, and a valve unit attached to the bottom of said flange in registry with said opening including a portion supporting said neck.

2. In a structure of the class described, in combination, an angle-iron including a horizontal flange and a vertical flange, said horizontal flange having a circular opening formed therein, a seed holding container, the bottom thereof having a conical hopper and a centralized depending tubular neck extending into the opening in said horizontal flange, a valve unit attached to the bottom of said flange in registry with said opening including a portion supporting said neck, together with a plurality of strap retaining elements secured to said container and to said angle-iron to hold the container in place.

ARTHUR WADDICK.